United States Patent [19]

Miller

[11] 3,723,488
[45] Mar. 27, 1973

[54] ETHYLENE-BIS-DITHIOCARBAMATO BIS-CHLOROSTANNANES

[75] Inventor: George A. Miller, Glenside, Pa.

[73] Assignee: Rohm and Haas Company, Philadelphia, Pa.

[22] Filed: Sept. 17, 1971

[21] Appl. No.: 181,562

[52] U.S. Cl...............................260/429.7, 424/288
[51] Int. Cl................................................C07f 7/22
[58] Field of Search....................................260/429.7

[56] References Cited

UNITED STATES PATENTS

| | | | |
|---|---|---|---|
| 3,413,273 | 11/1968 | Alicot et al. | 260/429.7 |
| 3,609,120 | 9/1971 | Wood et al. | 260/429.7 |
| 3,674,824 | 7/1972 | Amidon et al. | 260/429.7 |
| 3,538,088 | 11/1970 | Hartmann | 260/429.7 |
| 3,665,025 | 5/1972 | Wowk | 260/429.7 |

Primary Examiner—Werten F. W. Bellamy
Attorney—George W. F. Simmons et al.

[57] ABSTRACT

Certain ethylene-bis-dithiocarbamato bis-chlorostannanes are fungicidal compounds having the formula:

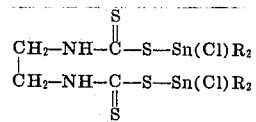

where R is a hydrocarbyl group selected from the group consisting of N-alkyl of one to eight carbon atoms and phenyl.

5 Claims, No Drawings

ETHYLENE-BIS-DITHIOCARBAMATO BIS-CHLOROSTANNANES

This invention relates to organotin compounds useful as fungicidal compositions. The compositions are suitable for use on living plant materials intended for human or animal consumption. The invention also relates to a method of controlling the growth of fungi on plant materials through the use of the compositions. The compounds are ethylene-bis-dithiocarbamato bis-chlorostannanes of particular composition.

British Pat. No. 797,073 (Hoechst) shows organotin compounds useful for combating fungus diseases of plants. The compounds are

wherein the $R_1$ may be alkyl, aryl, $>C = O$ groupings etc. and $R_2$, $R_3$, and $R_4$ may be the same as $R_1$ and in addition may be halogen. The patent specifically mentions di-n-butyl-di-diethyl-dithiocarbaminato-stannane. British Pat. No. 835,546 (Hoechst) discloses pesticidal compositions containing as the active agents compounds of the same general formula as the above 797,073 patent wherein at least one R is ethylene-bis-dithiocarbaminato and the remaining R's are alkyl. Example 2 is named dibutyl-bis-(ethylene-bis-dithiocarbamato) stannane.

The compositions of the present invention are characterized by tetravalent tin structures wherein one of the tin valences is satisfied by linkage to the thio of an alkylene-bis-dithiocarbamato, one by a halogen and two by hydrocarbyl groups. The organotin compounds of this invention have the structural formula

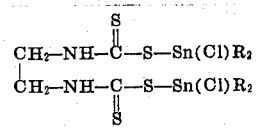

where R is a hydrocarbyl group selected from the groups consisting of n-alkyl of one to eight carbon atoms and phenyl. Examples of these compounds include ethylene-bis-dithiocarbamato bis(chlorodimethyl stannane); ethylene-bis-dithiocarbamato bis(chlorodi-n-butyl stannane); ethylene-bis-dithiocarbamato bis(chloro-di-n-octyl stannane); and ethylene-bis-dithiocarbamato bis(chlorodiphenyl stannane). A single compound of the above structural formula or a mixture of two or more of these compounds may be present in the fungicidal compositions of this invention.

It has been found that these compositions possess a superior order of fungicidal activity giving good to excellent rain persistent control of various plant diseases. Furthermore, the compositions surprisingly lack phtotoxicity. This characteristic represents a significant advantage of the present compositions over common commercially used fungicides, and particularly those based on triphenyl tin that are sometimes limited in use because of their toxicity to the host plant. The compositions are also advantageously soluble in organic solvents.

The novel fungicidal compounds may be prepared by any suitable and convenient procedure. For example, a dialkyl or diaryltindichloride and sodium ethylene-bis-dithiocarbamate may be reacted in a solvent system such as ethanol, acetone, an ethanol-water mixture or an acetone-water mixture at a temperature in the range of 0° to 80°C., preferably 25° to 40°C. The ratio of reactants may vary from 4:1 to 1:1 but preferably is in the range of 2:1 tin compound to sodium ethylene-bis-dithiocarbamate. The products of the reaction can be isolated by any suitable method such as by filtration, extraction or evaporation.

While the fungicidal compositions of this invention may be applied as such to the soil, they are ordinarily and preferably combined with an inert fungicidal adjuvant carrier and applied as a solution, emulsion, suspension or dust to the plant foliage. Suitable compositions that contain about 20 percent to 90 percent by weight and preferably 50 percent to 75 percent by weight, of the active agent are particularly suitable for this use. The compositions may also contain a wetting agent such as alkyl sulfate, and alkyl aryl sulfonate, a sulfosuccinate, a polyethylene glycol ether, and the like. Alternatively, the fungicidal compounds may be dissolved in an organic solvent, such as acetone, naphtha, ethylene chloride, or kerosene, and applied as solutions, or they may be mixed with or deposited upon such finely-divided solid carriers as clay, chalk, bentonite, talc, kaolin, fuller's earth, and the like and applied as dusts.

The fungicidal compounds may be applied by known techniques to plants, to plant seeds, or to the soil in which plants are growing or are to be grown. They may be applied to the parts of the plants above or in the soil, or the plant seeds may be contacted with the fungicidal compound. Alternatively, the fungicide may be introduced into the soil near the roots of the plants or applied to the surface of the soil and then mixed into the soil to the desired depth.

The amount of the fungicidal composition that is applied is dependent upon such factors as the species of plant being treated and the plant pathogen whose control is desired. The optimum amount is that amount which will inhibit or prevent the growth of the plant pathogen while causing little or no injury to the plants. About one-eighth pound to 2 pounds of the active compound is ordinarily applied per acre with particularly good results being obtained when one-fourth pound to three-fourths pound per acre is used.

Example 1

This, and the following two examples illustrate the preparation of compositions of the present invention.

To a solution of 365 g. (1.2 mol) of dibutyltindichloride in 1500 ml. of acetone was added in several minutes at 25°C. 154 g. (0.6 mol) of sodium ethylene-bis-dithiocarbamate. The slurry exothermed to about 40°C. and turned from yellow to white in color. After 1 hour the slurry was filtered to remove the sodium chloride, and the acetone was removed under vacuum. The oil residue was then stirred in 1 liter of water until it solidified to a white solid. Filtration and drying gave 370 g. (82 percent) of ethylene-bis-dithiocarbamato bis-chlorodibutylstannane, m.p. 100° – 104°C., designated composition "1" in the following examples.

Example 2

To 20.0 g. (0.0581 mol) of diphenyltindichloride in 200 ml of acetone was added over a period of 10 minutes 7.4 g. (0.029 mol) of sodium ethylene-bis-dithiocarbamate, causing an exotherm to about 30°C. After stirring for 1 hour the slurry was filtered and the filtrate was evaporated to a gummy residue. The residue was stirred vigorously in 350 ml of water to yield a white solid. Filtration and drying gave 19.0 (79 percent) of ethylene-bis-dithiocarbamato bis-chlorodiphenylstannane, m.p. 152°–153°C., designated composition "2" in the following examples.

Example 3

Using procedures similar to those of Examples 1 and 2, ethylene-bis-dithiocarbamato bis-chlorodimethyl-stannane, m.p. 164° – 165°C., and ethylene-bis-dithiocarbamato bis-chloro-di-n-octylstannane, m.p. 68°–69°C., were prepared.

Example 4

This example and some of the following illustrate the effectiveness of the present invention as a fungicide. This example evaluates a compound of the present invention and a prior art agent known to be useful for combating plant diseases caused by fungi.

In this example the ethylene-bis-chlorodibutylstannane prepared in Example 1 (compound 1) is compared to a coordination product of zinc ion and manganese ethylene bis-dithiocarbamate (hereinafter designated "A") prepared according to the procedure set out by Lyon et al., U.S. Pat. No. 3,379,610, issued Apr. 23, 1968. The compositions are evaluated to determine their activity on late blight, *Phytophthora infestans*, of tomatoes according to the following procedure.

Tomato seedlings about 4 weeks old are sprayed to run-off on a belt sprayer using 2 side and 1 overhead nozzle at 60 psi line pressure. The solvent employed is 25 percent acetone, 25 percent methanol, and 50 percent water. The treated plants are held 4 days at ambient temperature after which time they are given 1 inch of rain by applying a water spray to the upper and lower surfaces. Infection is then accomplished by spraying on a spore suspension of *Phytophthora infestans* obtained from bean agar cultures. Seventy-two hours after inoculation the disease level in each of four replicate seedlings is noted on a scale of 10 = 100 percent disease to 0 = no disease and the percentage control is calculated from the mean readings. The results are as follows:

| | Late Blight Control Percent Control | | |
|---|---|---|---|
| Dosage: | 1 pound per 100 gal. | 1/2 pound per 100 gal. | 1/8 pound per 100 gal. |
| Compositions | | | |
| 1. | 94 | 95 | 22 |
| A. | 78 | 44 | 20 |

Example 5

Compositions 1 and A are evaluated to determine their activity on Net Blotch, *Helminthosporium teres*, on Barley according to the following procedure.

Wong barley seedlings 4 inches tall are sprayed to run-off with compound suspended in 50 percent methanol/50 percent water over a dosage range of ½ lb./100 gal. of carrier to 1/32 lb./100 gal. of carrier. After the spray residue dries, the seedlings are placed in a fog chamber overnight to permit the chemicals to weather. The following day a spore suspension of *Helminthosporium teres* is applied to the seedlings as a spray followed by 24 hours at 80°F. Three days after infection, lesions are counted on 40 plants per dosage and percentage control is determined. The results are as follows:

| | Barley Net Blotch Control | | | | |
|---|---|---|---|---|---|
| | 1 pound /100 gal. | 1/4 pound /100 gal. | 1/8 pound /100 gal. | 1/16 pound /100 gal. | 1/32 pound /100 gal. |
| 1. | 96 | 94 | 88 | 78 | 75 |
| A. | 99 | 90 | 79 | 70 | 67 |

Example 6

In this example, the ethylene-bis-dithiocarbamato bis-chlorodiphenylstannane prepared in Example 2 (compound 2), compound 1, Panogen 15 (2.2 percent cyanol(methylmercuri) guanidine, hereinafter designated B) and (decyltriphenylphosphonium)-bromochlorotriphenylstannate (hereinafter designated C) are compared to determine their activity in a Pythium Wheat Seed Treatment according to the following procedure:

The experimental tin compounds are dissolved in 1:1 acetone/methanol and water added to give a 50 percent water solution. Panogen is applied in water. These are slurried onto wheat seed variety GA-1123 to give 2 and 4 oz/cwt. of seed. The seeds in uniform lots are then planted in 3 replicate trays of a medium containing 9 parts sand and 2 parts Phthium infested humus. The trays are held for 8 days at 64°–68° in a cold chamber with misted air to provide maximum soil moisture. After 8 days the stand is noted on a scale of 5 = none to 0 = 95–100 percent. The results are as follows:

| | Wheat Stand | |
|---|---|---|
| | 2 oz./cwt. | 4 oz./cwt. |
| Compound 1 | 0 | 0 |
| Compound 2 | 0 | 0 |
| B. | 0 | 0 |
| C. | 3 | 3 |
| Control | 3 | - |

Example 7

In this example, the ethylene-bis-dithiocarbamato bis-chlorodimethylstannane prepared in Example 3 (hereinafter designated "3"), the ethylene-bis-dithiocarbamato bis-chlorodi-n-octylstannane also prepared in Example 3 (hereinafter designated "4"), compounds 1, 2, A, C, and Brestan 60 (triphenyltin acetate and 20 percent manganese ethylene-bis-dithiocarbamate, hereinafter designated "D"), are evaluated to determine their activity on Net Blotch, *Helminthosporium teres*, On Barley according to the following procedure.

Barley seedlings of the Wong variety are spray treated with experimental chemicals in 25 percent acetone, 25 percent methanol, and 50 percent water.

The commercial products are applied in water. Twenty seedlings are employed per dosage. Inoculation is by application of a spore suspension as per Example 5. Plants are indexed for disease level on a scale of 0 = no disease to 10 = severely diseased, and the percentage control is determined. The slide spore inhibition study employs the technique described in Vol. 33 of "Phytopathology," pages 627–631, 1943. The results are as follows:

| | Percent Control Amount Per 100 Gallons | | | | | |
|---|---|---|---|---|---|---|
| | 1/2 | | 1/4 | | 1/8 | |
| | Persisted | Non Persisted | Persisted | Non Persisted | Persisted | Non Persisted |
| A | 75.0 | 97.0 | 76.0 | 92.0 | 70.0 | 89.0 |
| C | 0 | 0 | 0 | 0 | 0 | 0 |
| D | 0 | 0 | 0 | 0 | 0 | 0 |
| 1 | 71.0 | 96.0 | 74.0 | 95.0 | 62.0 | 94.0 |
| 2 | 65.0 | 87.0 | 64.0 | 88.0 | 64.0 | 73.0 |
| 3 | 90.0 | 80.0 | 87.0 | 82.0 | 87.0 | 87.0 |
| 4 | 82.0 | 92.0 | 84.0 | 91.0 | 74.0 | 90.0 |

Example 8

In this example compositions 1, 2, 3, 4, A and C are evaluated to determine their activity on *Botrytis cinerea* and in a celery blight persistency test using *cercospora apii* as the test organism according to the following procedure:

Cercospora blight control is determined by spraying two pots of celery containing 3 leafy stalks per pot and then subjecting these to 1 inch of artificial rain. Infection is accomplished by spraying on a suspension of spores of *Cercospora apii* and placing the plants in a 80°F. moist chamber for 24 hours, then in the greenhouse for several days until lesions develop. Activity is noted as A = excellent control, B = good control, C = slight to no control. The results are as follows:

| | Slide Spore Mean percent Germination Inhibition of Botrytis cinerea | | | | Cercospora Blight Degree of Control | |
|---|---|---|---|---|---|---|
| | PPM | | | | PPM | |
| | 20 | 50 | 10 | 1 | 1200 | 150 |
| A | 100 | 100 | 75 | 0 | AA | CC |
| C | 100 | 100 | 100 | 100 | AA | AB |
| 1 | 56 | 30 | 0 | 0 | AA | CC |
| 2 | 29 | 0 | 0 | 0 | AA | AA |
| 3 | 29 | 0 | 0 | 0 | AA | CC |
| 4 | 49 | 0 | 0 | 0 | CC | CC |

A = Excellent control
B = Good control
C = Poor, less than 50% control

What is claimed is:

1. An organotin compound having the structural formula

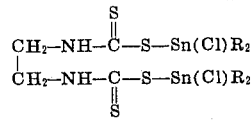

where R is a hydrocarbyl group selected from the group consisting of n-alkyl of one to eight carbon atoms and phenyl.

2. The compound of claim 1 wherein R is methyl.
3. The compound of claim 1 wherein R is n-butyl.
4. The compound of claim 1 wherein R is n-octyl.
5. The compound of claim 1 wherein R is phenyl.

* * * * *